US009266022B1

United States Patent
Pasqualone

(10) Patent No.: US 9,266,022 B1
(45) Date of Patent: Feb. 23, 2016

(54) SYSTEM TO PAUSE A GAME CONSOLE WHENEVER AN OBJECT ENTERS AN EXCLUSION ZONE

(71) Applicant: David Paul Pasqualone, Pensacola, FL (US)

(72) Inventor: David Paul Pasqualone, Pensacola, FL (US)

( * ) Notice: Subject to any disclaimer, the term of this patent is extended or adjusted under 35 U.S.C. 154(b) by 107 days.

(21) Appl. No.: 13/972,084

(22) Filed: Aug. 21, 2013

Related U.S. Application Data

(60) Provisional application No. 61/691,656, filed on Aug. 21, 2012.

(51) Int. Cl.
*A63F 9/24* (2006.01)
*A63F 13/40* (2014.01)

(52) U.S. Cl.
CPC .................................... *A63F 13/10* (2013.01)

(58) Field of Classification Search
CPC ....................................................... A63F 13/10
See application file for complete search history.

(56) References Cited

U.S. PATENT DOCUMENTS

| | | | |
|---|---|---|---|
| 5,076,584 A | 12/1991 | Openiano | |
| 6,169,678 B1 * | 1/2001 | Kondo et al. | 363/71 |
| 6,343,991 B1 | 2/2002 | Armstrong | |
| 6,512,511 B2 | 1/2003 | Willner et al. | |
| 6,955,598 B2 | 10/2005 | Hagiwara et al. | |
| 7,976,386 B2 | 7/2011 | Tran | |
| 8,162,747 B2 | 4/2012 | Hayasaka | |
| 2007/0159354 A1 * | 7/2007 | Rosenberg | 340/902 |
| 2008/0132335 A1 | 6/2008 | Yamaguchi | |
| 2008/0146342 A1 | 6/2008 | Harvey et al. | |
| 2009/0186696 A1 | 7/2009 | Shai-Hee | |
| 2009/0215542 A1 | 8/2009 | Takahashi | |
| 2009/0305742 A1 | 12/2009 | Caballero et al. | |
| 2009/0312101 A1 | 12/2009 | Pope | |
| 2010/0093435 A1 | 4/2010 | Glaser et al. | |
| 2011/0118026 A1 | 5/2011 | Lukas et al. | |
| 2011/0124387 A1 | 5/2011 | Sauerbrei et al. | |
| 2011/0200304 A1 * | 8/2011 | Rutledge | 386/248 |
| 2011/0230263 A1 * | 9/2011 | Ng | 463/31 |
| 2011/0274435 A1 | 11/2011 | Fini et al. | |
| 2012/0004031 A1 | 1/2012 | Barney et al. | |
| 2012/0058825 A1 | 3/2012 | Takehiro | |
| 2012/0083341 A1 | 4/2012 | George et al. | |
| 2012/0094759 A1 | 4/2012 | Barney et al. | |
| 2012/0229281 A1 * | 9/2012 | Raju | 340/573.1 |

* cited by examiner

*Primary Examiner* — Dmitry Suhol
*Assistant Examiner* — Carl V Larsen
(74) *Attorney, Agent, or Firm* — Peter Loffler

(57) ABSTRACT

A system for use in an interactive gaming console system wherein the gaming console system uses a sensor monitor to detect player actions, wherein either the sensor monitor's motion and proximity sensors or dedicated motion and proximity sensors detect whenever an object enters an exclusion zone, which is the area wherein the object is too close to the sensor monitor. If an object is detected within the exclusion zone, then the game being played by the gaming system is paused at the point of played and resumed after a set or settable time delay or after a manual resume command is issued by user in the usual way. A warning zone can also be defined just beyond the exclusion zone so that a warning signal of appropriate type can be issued to warn a player that the player is approaching the exclusion zone allowing the player to back away from the exclusion zone.

4 Claims, 3 Drawing Sheets

SYSTEM TO PAUSE A GAME CONSOLE WHENEVER AN OBJECT ENTERS AN EXCLUSION ZONE

This application claims the benefit of U.S. provisional patent application No. 61/691,656, filed on Aug. 21, 2012, which provisional application is incorporated herein by reference.

BACKGROUND OF THE INVENTION

1. Field of the Invention

The present invention relates to a software system modification, or a sensor monitor modification to an interactive gaming console, whereby the game console pauses its play of a game whenever an object is detected within an exclusion zone.

2. Background of the Prior Art

Modern gaming consoles that are connected to a television or other video output device rely on sensor monitors, which include sensor bars coupled with wireless handheld controllers or video cameras, for operation, have become extremely popular in the last few years. These gaming consoles, which include the Wii and the Wii U, made by Nintendo of Minami-ku Kyoto, Japan, the PlayStation 3 Move (and soon to be released PlayStation 4) made by Sony Corporation of Minato Tokyo, Japan, and the XBOX Kinect (and soon to be released XBOX One) made by Microsoft Corporation of Redmond, Wash., allow players to play various games, including fight games, tennis, golf, baseball, race car driving, aerobics, to name a few, without being physically connected to either the game console or the video output device. While each system, and other game consoles vary dramatically in the underlying technologies employed, the basic principle under which these modern gaming consoles operate is the same.

A sensor monitor is positioned on or near the video output device, usually centered along the screen of the video output device, with the sensor monitor capturing the actions of the player or players using the gaming console. The sensor monitor captures the movements each player as well as distance of each player with respect to the sensor monitor. These and other data captures are transmitted by the sensor monitor to the gaming controller which is running the software routine of the game being play, with the data being integrated by the software into the game.

Each gaming system uses a different sensor monitor technology. For example, the Wii systems rely on a bank of infrared LEDs that issue infrared beams, which beams are picked up by the Wii remotes, which are held by the users of the gaming console. The infrared information then sent via Bluetooth to the gaming console, which then processes the information received to determine the position of the Wii remotes in relation to the beams being transmitted from the sensor. The PlayStation 3 Move sensor uses a digital camera and microphone array. The camera uses computer vision and gesture recognition that are used in conjunction with information captured by inertia detectors on the remotes held by the gaming console users to detect position and motion of the players. The XBOX connect uses a camera, depth sensor and voice detector to determine player position and movement.

Each of these sophisticated systems allows play of very dynamic game play across a wide range of game genres. Each sensor operates in a range of distances between the players and the sensor. For example, the Wii is essentially effective in a range between about 3 feet and about 8 feet between the remote and the sensor. A controller being used beyond this range is less effective until the sensor monitor can no longer "see" the remote, which is also true for a sensor that operates too close to the sensor. When the remotes are not within the proper working range away from the sensor monitor, the onscreen actions tend to become jerky or erratic and cause much frustration for the players, especially to players who are unaware that that they are outside the proper operating range or even that there is an operating range, especially when the players stray too close to the sensor monitor. Dissatisfaction with the gaming console tends to result from this jerky and erratic game play. The other gaming systems also have proper operating ranges similar in order of magnitude to the Wii systems.

One of the problems experienced by many users of modern gaming consoles is the proximity creep that many players unwittingly undertake during game play. As the players become increasingly involved with the game being played, especially a multiplayer competitive game, the players tend to move ever closer to the video screen upon which the game is being displayed, as well as toward each other. This inward creep causes problems. If a player is unaware of his or her ever closer proximity to the sensor monitor, and thus the video output device, the player may inadvertently strike the video screen, either directly or with the remote, if the gaming system uses handheld remotes. This can cause injury to the player as well as damage to the remote, to the video display, to the entertainment center upon which the video display rests, and other possible collateral damage (i.e., a 60 inch television toppled off of an entertainment center has much potential to damage surrounding items, such as another player, the wall, flooring, vases, the cat, etc.). If the player does not hit the video display or structure upon which the video display rests during inward creep, the player may instead hit another player, possibly resulting in jury to one or both players.

A similar problem during game play is that by Murphy's Law, whenever a player is deeply immersed in his or her game and is just about to face a pivotal foe, time a maneuver just right, or make the money shot, someone walks in front of the video display device, blocks the player's view, and ruins the opportunity for victory. Not only does this cause frustration to the player having missed his or her golden opportunity, but can lead to arguments and possibly off screen "game" play (i.e., fights).

The gaming console manufacturers advise in their instruction manuals about the proper range of operation between the players and the sensor monitor and warn, both in the instruction manual and with an onscreen message before each game about the dangers of getting too close to the video output device and to other players, but in the heat of the game, many players simply fail to heed this important advice.

Accordingly, what is needed is a system whereby players are prevented from creeping too close to the gaming console's sensor monitor, and thus the video output device upon which the game is being played, in order to avoid the pitfalls and dangers associated with such proximity creep. Such a system must be able to quickly detect the fact that one or more players are too close to the sensor monitor and immediately take action to cease the inward proximity creep, all without ruining the game being played.

SUMMARY OF THE INVENTION

The system to pause a game console whenever an object enters an exclusion zone of the present invention addresses the aforementioned needs in the art by providing a system, either essentially hardware based, or essentially software based, that detects whenever an object, including a player, a passerby, a pet, etc., comes too close to a game console's sensor monitor and thus the exclusion zone, and thus the video output device upon which the game console is being used. Whenever an object enters the exclusion zone, the game being played is paused until restarted, which restart can be by affirmative action of the user or automatically after an appropriate amount of time has elapsed or both. In this way, if one or more players, in the heat of gaming battle, are creeping toward the sensor monitor, and thus the video output device, which may also mean toward other players, the game pauses before injury or property damage occurs. If a passerby enters the exclusion zone, the game pauses before ruining a player's golden moment, allowing the player to resume the shot for victory after the passerby leaves the exclusion zone and the game restarts at the point of pausing.

The system to pause a game console whenever an object enters an exclusion zone of the present invention comprises a gaming control unit running a software routine that runs a game and displays the game being run on an output device. The software routine is capable of being paused at a point within the game, and thereafter resumed from the point. A forward direction (as opposed to an omnidirectional) looking sensor monitor determines motion of an object and the distance of the object from the sensor monitor in the forward direction. The sensor monitor is in communication with the gaming control unit such that the gaming control unit receives input signals gathered by the sensor monitor and uses the input signals to control the software routine such that if the sensor monitor senses that a moving object is in the forward direction and at a distance from that sensor monitor that is less than a first threshold distance, the gaming control unit issues a threshold pause and pauses the software routine. The sensor monitor, if it has a dedicated motion sensor and a proximity sensor that are used to pause the game, issues a proximity signal to the gaming control unit for the gaming control unit to issue the threshold pause. The gaming control unit may make a perceptible warning if the sensor monitor senses that a moving object is in the forward direction and is at the proximity distance from the sensor that is more than the first threshold distance and less than a second threshold distance. The threshold distance may be variable. The gaming control unit can automatically resume running of the software routine after a set amount of time has elapsed (which set amount of time may be variable) and the sensor monitor no longer determines that a moving object is closer to the sensor monitor than the first threshold distance in the forward direction or the gaming control unit can resume running of the software routine upon the issuance of a user issued resume command is sent to the gaming control unit and the sensor monitor no longer determines that a moving object is closer to the sensor monitor than the first threshold distance in the forward direction. The gaming control unit may have an accumulator that calculates the number of times the threshold during a set time interval and if the number of times calculates exceeds a threshold number, the software routine pauses the software routine for a set amount of time or until a set code is communicated to the gaming control unit.

BRIEF DESCRIPTION OF THE DRAWINGS

Similar reference numerals refer to similar parts throughout the several views of the drawings.

DESCRIPTION OF THE PREFERRED EMBODIMENT

Figure 1:
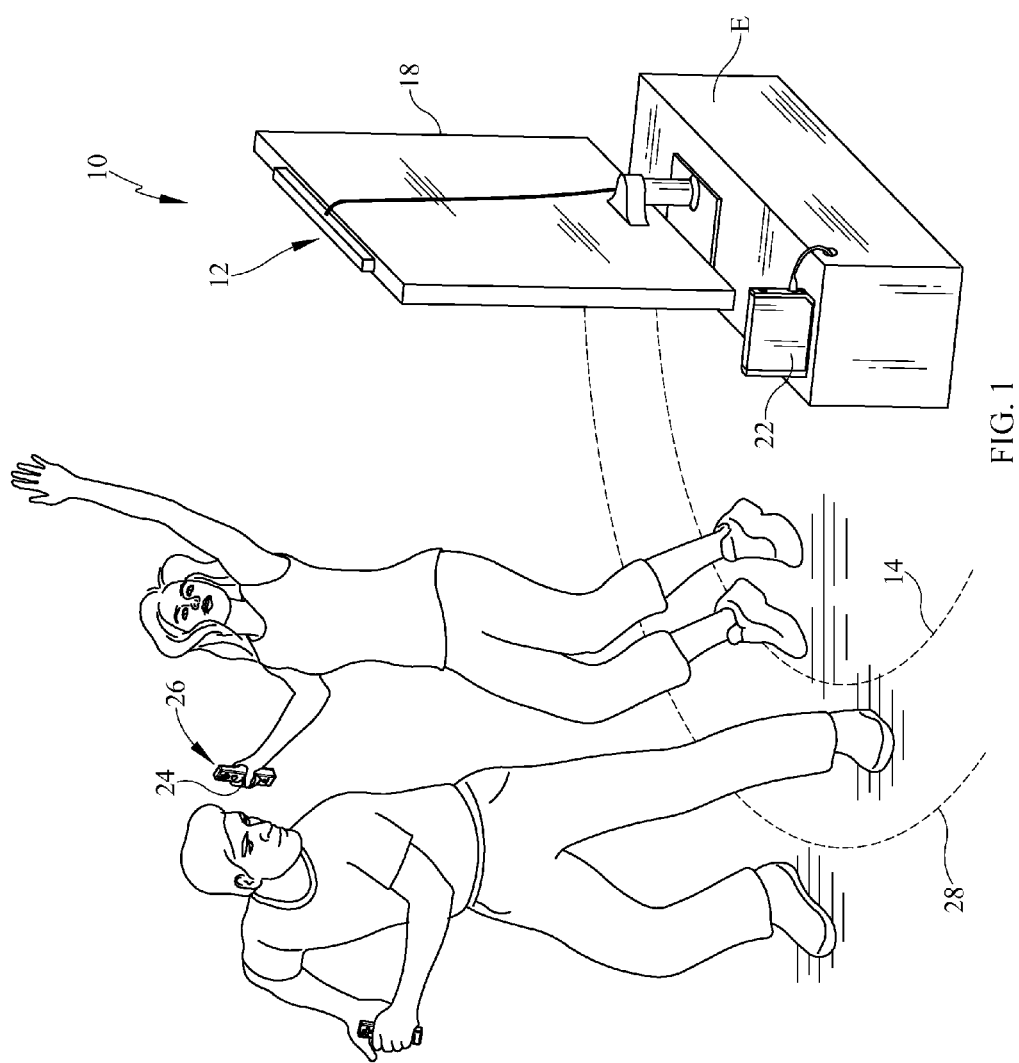
FIG. 1 is an environmental view of the system to pause a game console whenever an object enters an exclusion zone of the present invention that relies on the motion detector and proximity sensor inherent within a game console's existing sensor monitor.
Figure 2:
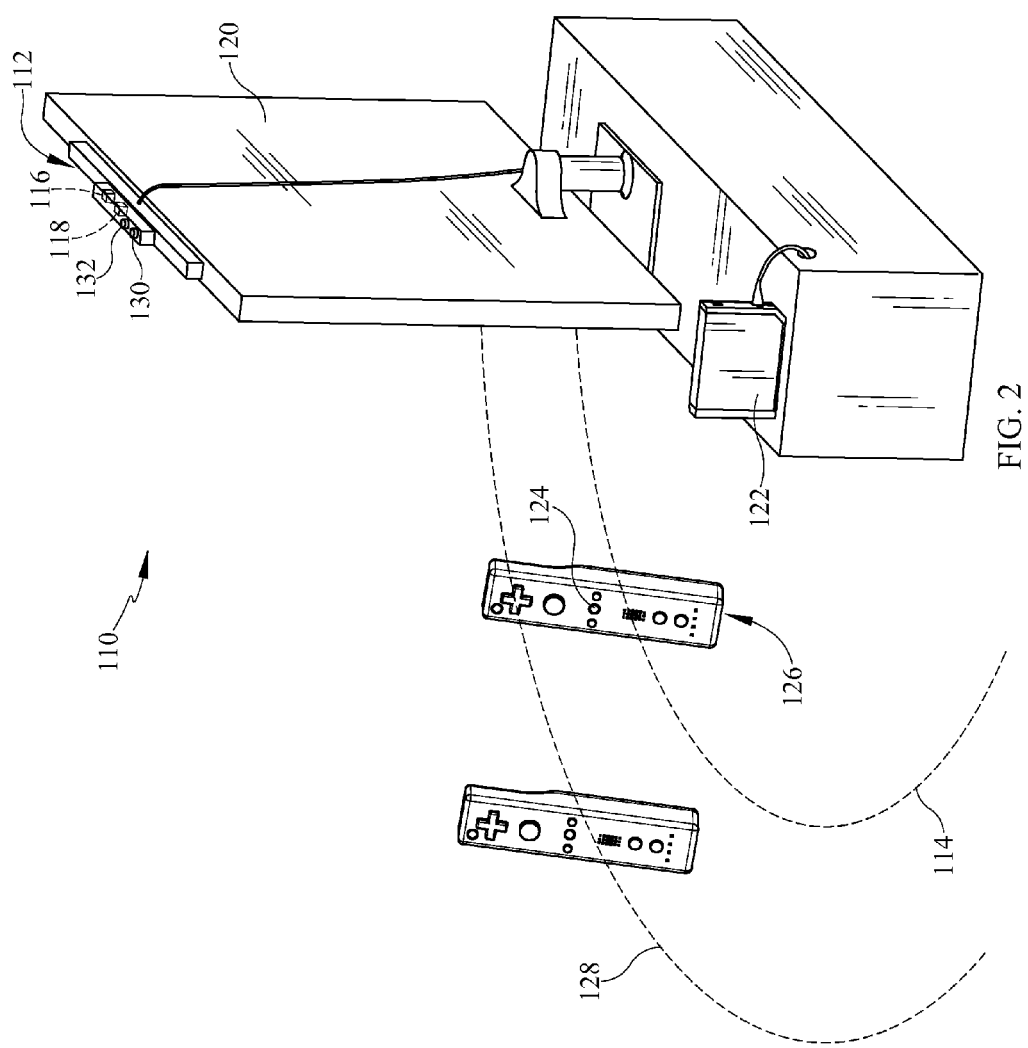
FIG. 2 is an environmental view of the system to pause a game console whenever an object enters an exclusion zone of the present invention that uses a dedicated motion detector and proximity sensor on the gaming console's sensor monitor for operation.
Figure 3:
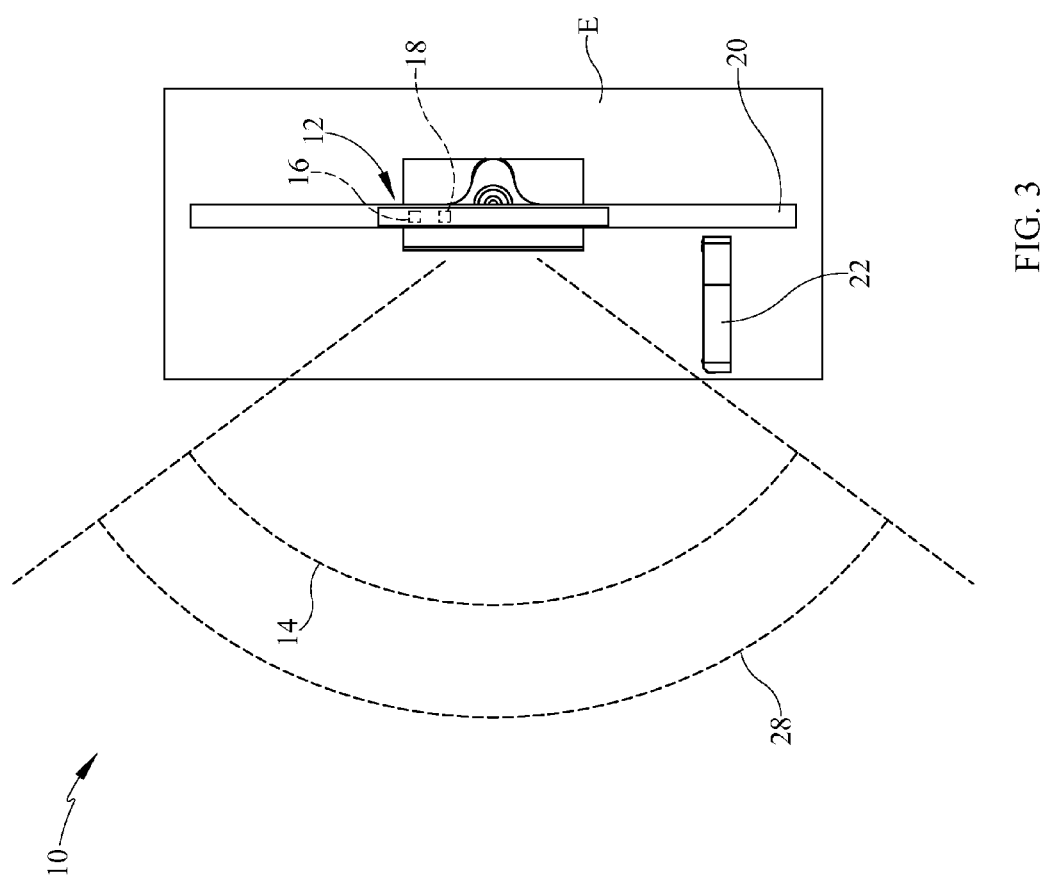
FIG. 3 is a plan view of the environmental view of the system to pause a game console whenever an object enters an exclusion zone of FIG. 1.

Referring now to the drawings, it is seen that the system to pause a game console whenever an object enters an exclusion zone of the present invention, generally denoted by reference numeral 10, is comprised of an essentially software solution that relies on the motion sensor and proximity sensor that are present in a gaming console's sensor monitor or a hardware solution that relies on a dedicated motion detector and proximity sensor on the gaming console's sensor monitor. While the software solution is preferred by the inventor, as there is no need to modify existing hardware on current gaming systems, the hardware approach can be deployed.

In the software only solution, the gaming system's software is modified so that the sensor monitor 12 detect the presence of an object P that is within the exclusion zone 14 and pauses the game at the point of play whenever an object P is detected within the exclusion zone 14. This is possible because the sensor monitor 12 of the gaming console has both a motion sensor 16 and a proximity sensor 18 (of course each sensor 16 and 18 can be comprised of more than one physical object used to accomplish its detection task) in order to detect motion of the players and the distance of each player from the sensor monitor 12 respectively for proper gaming system play. The exclusion zone 14 can be set by the manufacturer, for example, the exclusion zone 14 may be beyond the near boundary proper working range of the sensor monitor 12—if the proper working range for game play is 3 feet to 8 feet, the exclusion zone 14 can be set by the manufacturer to detect an object P that is closer to the sensor monitor 12 than the 3 feet minimum distance required for proper functioning. Alternately, the exclusion zone 14 can be set by a user in an appropriate configuration screen (which may be password protected so as to allow only parents or other responsible persons, and not the players to set the exclusion zone 14). This user setting of the exclusion zone distance is especially useful for gaming configurations wherein the sensor monitor 12 is mounted on a stand that is set in front of the video display device 20 being used, and the user can compensate for this additional buffer provided.

In operation, a player P plays a game on the gaming console in the usual way. If an object, which may be a player, a pet passing through, etc., enters the exclusion zone 14, the motion sensor 16 of the sensor monitor 12 captures the movement of the intruding object while the proximity sensor 18 captures the distance of between the intruding object and the sensor monitor 12, which is communicated by the sensor monitor 12 to the gaming controller 22 that is running the software routine of the game being played. The operating system of the game console processes that an object in motion is within the exclusion zone 14 and immediately pauses the game being played at a given point. The requirement for both the proximity sensor 16 to detect an object within the exclusion zone 14 and the motion sensor 16 to detect motion of that object is so that stationary objects, such as the entertainment center E upon which the video display 20 is seated, a lamp, or even a wall, is not identified as an exclusion zone 14 intrusion, only objects in motion.

The pausing of the game being played at the point of play may be a hard pause that requires the user to resume the game in the usual way as if the game was intentionally paused by the user. For example, depression of the Home button 24 on a Wii controller 26 pauses the game being played, so that in a hard pause configuration, once the game is paused due to an object entering the exclusion zone 14, one of the players P depresses the home button 24 to resume the game at the point whereat the game paused. Alternately, the pause may be a soft pause that pauses the game after a time delay (typically a few seconds which may be set by the manufacturer or configured by the user in appropriate fashion, possibly having some threshold minimum and possibly password protected so only parents or other responsible adults can configure) so that once the game is paused due to an object entering the exclusion zone 14, the game resumes automatically after the elapse of the time delay, allowing the object to clear the exclusion zone 14 or the players to back up out of the exclusion zone 14. Additionally, a counter can be used so that if a certain number of exclusion zone violations occur within a set time period (both the number of violations and the time period within which the violation accumulate can be set by the manufacturer or via user configuration via the appropriate onscreen configuration), the game is paused by the operating system for a cool down period (which is longer than the normal pause period in a soft pause configuration) or can pause indefinitely until an appropriate unlock, such as the entering of a pause code held by a parent, is undertaken.

Additionally, the system to pause a game console whenever an object enters an exclusion zone 10 can be configured to have a warning zone 28, that is the area immediately adjacent the exclusion zone 14—for example, if the exclusion zone 14 is 3 feet or less from the sensor monitor 12, the warning zone 28 may be established to be an additional foot beyond the exclusion zone 14 (that is, between 3 feet and 4 feet from the sensor monitor 12, but varies if the exclusion zone 14 is variable, so that if the warning zone 28 is one foot wide, and the exclusion zone 14 is reduced down to 2.5 feet, then the warning zone 28 is located between 2.5 feet and 3.5 feet away from the sensor monitor 12). If a player enters the warning zone 128, as detected by the motion sensor 16 and the proximity sensor 18 of the sensor monitor 12, then a warning, which may be audible or visual or even vibratory, and may be emitted from the video display device 18, the gaming system remote 26 or both. In this way, a player P is warned that he or she is about to enter the exclusion zone 14, allowing the player P to take corrective action prior to entering the exclusion zone 14 and avoid pausing of the game being played.

In a hardware configuration of the system to pause a game console whenever an object enters an exclusion zone 110, the sensor monitor 112 of the game console is modified to have a dedicated motion sensor 116 and proximity sensor 118 onboard, these dedicated sensors 116 and 118 having the sole function of determining if the exclusion zone 114 has been violated. The motion sensor 116 and the proximity sensor 118 can each be any appropriate sensor for their respective task known in the art. If the motion sensor 116 detects motion of an object and the proximity sensor 118 detects that the moving object is within the exclusion zone 114, a pause signal is sent to the operating system gaming controller 122 running the software routine of the game by the sensor monitor 112 to pause the game at the point of play. The game is resumed at this point of play whenever a user hits the resume command, such as by depressing the home button 124 on a Wii remote 126. Alternately, the sensor monitor may have timer that is started whenever the sensor monitor 112 sends the pause command to the gaming controller 122 so that after expiration of a certain time delay, the sensor monitor 112 sends a resume signal to the operating system of the gaming controller 122 to resume game play at the point of pause. This time delay can be set by the manufacturer or can be user adjusted via an appropriate control button 130 located on the game sensor monitor. Additionally, the distance between the sensor monitor 112 and the boundary of the exclusion zone 114 can be set by the manufacturer or can be user adjusted by an appropriate control button 132 located on the sensor monitor 112.

The hardware based system to pause a game console whenever an object enters an exclusion zone 110 may have a second proximity sensor 118 that allows a warning zone 126 to be established, that is the area immediately adjacent the exclusion zone 114—for example, if the exclusion zone 114 is 3 feet or less from the sensor monitor 112, the warning zone 128 may be established to be an additional foot beyond the exclusion zone 114 (that is, between 3 feet and 4 feet from the sensor monitor 112, but varies if the exclusion zone 114 is variable, so that if the warning zone 128 is one foot wide, and the exclusion zone 114 is reduced down to 2.5 feet, then the warning zone 128 is located between 2.5 feet and 3.5 feet away from the sensor monitor 112). If a player enters the warning zone 128, as detected by the motion sensor 116 and the proximity sensor 118 of the sensor monitor 112, then a warning, which may be audible or visual or even vibratory, and may be emitted from the video display device 120, the gaming system remote 126 or both. In this way, a player P is warned that he or she is about to enter the exclusion zone 114, allowing the player P to take corrective action prior to entering the exclusion zone 14 and its inconvenient pausing of the game being played.

While the invention has been particularly shown and described with reference to an embodiment thereof, it will be appreciated by those skilled in the art that various changes in form and detail may be made without departing from the spirit and scope of the invention.

I claim:

1. An interactive gaming system, for use by at least one player, the interactive gaming system comprising:
    a gaming control unit running a software routine that runs a game and displays the game being run on an output device, the software routine capable of being paused at a point within the game, and thereafter resumed from the point;
    a forward direction looking sensor monitor determines motion of an object and a proximity of the object from the sensor monitor in the forward direction, the sensor monitor in communication with the gaming control unit such that the gaming control unit receives input signals gathered from the sensor monitor and uses the input signals to control the software routine such that if the sensor monitor senses that a moving object is in the forward direction and is closer to the sensor monitor than a first threshold distance, the gaming control unit issues a threshold pause and pauses the software routine and wherein the gaming control unit issues a perceptible warning if the sensor monitor senses that a moving object is in the forward direction and at a proximity distance greater than the first threshold distance and less than a second threshold distance; and
    wherein the first threshold distance is variable and wherein the gaming control unit automatically resumes running of the software routine after a set amount of time has elapsed and the sensor monitor no longer determines that a moving object is closer to the sensor monitor than the first threshold distance in the forward direction and wherein the gaming control unit has an accumulator that calculates the number of times the threshold is exceeded during a set time interval and if the number of times calculates exceeds a threshold number, the software routine pauses the software routine until a set code is communicated to the gaming control unit.

2. The interactive gaming system as in claim 1 wherein the set amount of time is variable.

3. An interactive gaming system, for use by at least one player, the interactive gaming system comprising:
   a gaming control unit running a software routine that runs a game and displays the game being run on an output device, the software routine capable of being paused at a point within the game, and thereafter resumed from the point; and
   a forward direction looking sensor monitor determines motion of an object and a proximity of the object from the sensor monitor in the forward direction, the sensor monitor in communication with the gaming control unit such that the gaming control unit receives input signals gathered from the sensor monitor and uses the input signals to control the software routine such that if the sensor monitor senses that a moving object is in the forward direction and is closer to the sensor monitor than a first threshold distance, the gaming control unit issues a threshold pause and pauses the software routine and wherein the sensor monitor issues a proximity signal to the gaming control unit for the gaming control unit to issue the threshold pause and wherein the gaming control unit issues a perceptible warning if the sensor monitor senses that a moving object is in the forward direction and at a proximity distance greater than the first threshold distance and less than a second threshold distance and wherein the first threshold distance is variable and wherein the gaming control unit automatically resumes running of the software routine after a set amount of time has elapsed and the sensor monitor no longer determines that a moving object is closer to the sensor monitor than the first threshold distance in the forward direction and wherein the gaming control unit has an accumulator that calculates the number of times the threshold during a set time interval and if the number of times calculates exceeds a threshold number, the software routine pauses the software routine until a set code is communicated to the gaming control unit.

4. The interactive gaming system as in claim 3 wherein the set amount of time is variable.

* * * * *